United States Patent [19]

Fujita et al.

[11] Patent Number: 4,831,402
[45] Date of Patent: May 16, 1989

[54] CAMERA WITH CHANGEABLE FOCAL LENGTH

[75] Inventors: Yoshihiro Fujita, Tokyo; Takao Umetsu, Saitama; Ysuyoshi Masaoka, Saitama; Minoru Takahashi, Saitama, all of Japan

[73] Assignee: Fuji Photo Film Co., Ltd., Kanagawa, Japan

[21] Appl. No.: 200,423

[22] Filed: May 31, 1988

[30] Foreign Application Priority Data

May 29, 1987 [JP] Japan ................................ 62-133913

[51] Int. Cl.$^4$ ............................................... G03B 3/00
[52] U.S. Cl. ................................. 354/400; 354/195.12
[58] Field of Search ............ 354/400, 401, 402, 195.1, 354/195.12

[56] References Cited

U.S. PATENT DOCUMENTS

| | | | |
|---|---|---|---|
| 4,708,454 | 11/1987 | Kodaira et al. | 354/195.12 |
| 4,717,932 | 1/1988 | Hoshino et al. | 354/195.12 |
| 4,728,980 | 3/1988 | Nakamora et al. | 354/195.12 |
| 4,757,372 | 7/1988 | Beutensky et al. | 354/195.12 |
| 4,764,784 | 8/1988 | Torikoshi et al. | 354/195.12 |

Primary Examiner—Russell E. Adams
Attorney, Agent, or Firm—Young & Thompson

[57] ABSTRACT

A camera includes a taking lens system changeable in focal length between at least a short focal length suitable for wide-angle photography and a long focal length suitable for telephotography. The lens system is held in a lens barrel which is axially displaced by means of a motor to change the lens system between at least the two different focal lengths. The camera is provided with a controller for sequentially controlling the motor to move the lens barrel in one axial direction so as to change the lens system to have one of the different focal lengths selected by a focal length selecting switch, to move the lens barrel in the opposite axial direction when the lens barrel does not reach a position wherein the taking lens system has the selected focal length in a predetermined time period, and to stop when the lens barrel reaches the position wherein the taking lens system has another one of the different focal lengths. For detecting the lens barrel at the axial position where the taking lens system has the different focal lengths, the camera is provided with a detector for detecting an unusual motion of the lens barrel in cooperation with the controller.

6 Claims, 3 Drawing Sheets

| POSITION ENCODER | TELEPHOTO POSITION | INTERMEDIATE POSITION | WIDE-ANGLE POSITION |
|---|---|---|---|
| $E_A$ | H | H | L |
| $E_B$ | L | H | H |

CAMERA WITH CHANGEABLE FOCAL LENGTH

BACKGROUND OF THE INVENTION

The present invention relates to a camera with a changeable focal length, and more particularly to a changeable focal length camera equipped with a safety control device which acts when a taking lens system is interrupted in operation.

Recent compact cameras are equipped with taking lens systems of the type in which the focal length can be changed between various focal lengths, for example between a relatively short focal length suitable for wide-angle photography and a relatively long focal length suitable for telephotography. Such changeable focal length cameras have taking lens systems which generally include an axially movable lens and an extra lens which is displaced from or moved into the optical path of the taking lens system upon changing the focal length. In many instances, a position sensor is provided in association with the axially movable lens of the lens system in order to detect that the axially movable lens has moved to one of two possible lens positions, or to a position between the possible lens positions.

Other changeable focal length cameras have lens barrels which are thrust back and forth or protruded from and retracted into a camera body. Therefore, the lens barrel is sometimes interrupted from smooth movement due to external obstructions such as fingers, foreign articles or the like. In order to eliminate such interruptions, conventional changeable focal length cameras are provided with safety mechanisms which hold the axially movable lens when the movement of the lens barrel is interrupted. If a shutter release is operated when the axially movable lens is held at a position out of one of the possible lens positions, the camera cannot be properly focused on a subject. Therefore, the conventional changeable focal length cameras have the disadvantage that pictures are absolutely out of focus when the movement of the lens barrel is interrupted, and a timely shutter release is lost.

OBJECT OF THE INVENTION

It is, therefore, an object of the present invention to provide a changeable focal length camera which can be set to either one of two possible focal lengths even when the movement of the lens barrel is interrupted upon changing the focal length of a taking lens system of the camera.

SUMMARY OF THE INVENTION

For accomplishing the above object, the present invention provides a changeable focal length camera comprising a taking lens system held in a lens barrel which is moved by means of a motor to change the lens system between at least two focal lengths, a switch means for causing the motor to move the lens barrel in opposite directions so as selectively to change the lens system between the two different focal lengths, detecting means for detecting interruption of movement of a lens barrel whereby the lens system is prevented from changing to a focal length selected by the switch means, and a controller for controlling the motor to move the lens barrel so as to change the lens system to have a focal length which the lens system had when the detecting means detects the disabled lens barrel. The controller sequentially controls the motor at first to move the lens barrel in one axial direction so as to change the photographic lens system to have a focal length selected by the switch means, to move the lens barrel in the opposite axial direction when the detecting means detects no lens barrel at an axial position where the lens system has the selected focal length after a predetermined time period, or otherwise when the detecting means detects an unusual current flowing through the motor, and then to stop when the detecting means detects the lens barrel at a position where the lens system has the other focal length.

According to a feature of the present invention, the lens system can always be changed to either one of two possible focal lengths even though its movement is interrupted or disabled in order to have a selected one of the possible focal lengths. When the movement of the lens barrel is interrupted or disabled between the two axial positions, the lens barrel is considered to be malfunctioning and the occurrence of such malfunction in the motion of the lens barrel is memorized in a memory device.

Upon operating a shutter release member for exposure, the memory device is read. If the memory device has been set, after resetting the memory device, the lens barrel is moved to change the lens system to have the shorter focal length and, thereafter, the controller effects the sequential control described above. On the other hand, if the memory device has not been set, a shutter release is performed as usual for making an exposure.

Every time the switch means is operated, the memory device is read. If the memory device has been set, after resetting the memory device, the lens barrel is moved to change the lens system to have the shorter focal length and, thereafter, the controller effects the sequential control. However, if the memory device has not been set, the lens barrel is moved to a position opposite to the position which is detected by the position sensor.

BRIEF DESCRIPTION OF THE DRAWINGS

These and other objects and features of the present invention will become apparent from the following description of a preferred embodiment thereof with reference to the accompanying drawings in which.

DETAILED DESCRIPTION OF THE INVENTION

Figures 1, 2:
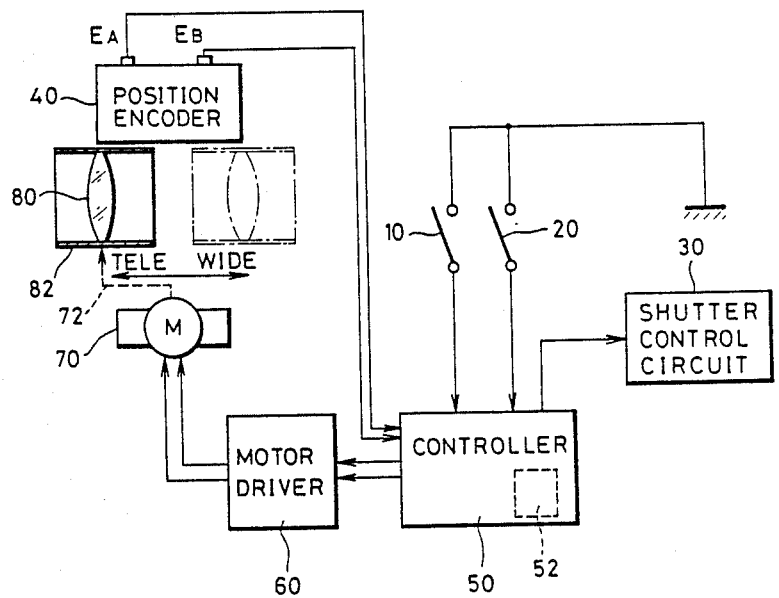
FIG. 1 is a diagrammatic illustration showing essential parts of a focal length changing mechanism of the camera of a preferred embodiment of the present invention.
FIG. 2 is a table showing outputs of the position encoder of FIG. 1.

Referring now to FIG. 1, there are shown various elements forming essential parts of a camera changeable in focal length, for example, between two different focal lengths, namely a relatively short focal length suitable for wide-angle photography and a relatively long focal length suitable for telephotography, according to the present invention. It is to be understood that camera elements not specifically shown may take various forms known to those skilled in the art. In FIG. 1, a taking lens system 80, which is depicted as a single-element lens for simplicity, is housed in a lens barrel 82 which is operationally coupled to a reversible-drive electric motor 70 through an interconnecting mechanism 72 well known in the art. The lens barrel is axially moved in the opposite direction by means of the reversible-drive electric motor 70 to change the focal length thereof. The lens barrel 82 is in cooperation with a position encoder 40 having two output terminals Ea and Eb for converting the axial position of the lens barrel 82 to three possible code signals which are shown in FIG. 2 and read by a controller 50. The motor 70 is controlled to reversibly rotate by a controller 50 through a motor driver 60. The controller 50, which essentially comprises a microcomputer, includes a memory device 52 comprising, for example, a register which is set by the occurrence of an unusual motion of the lens barrel 82.

In conjunction with the controller 50, there are an externally operable switch 10 for selectively changing the focal length of the lens system 80 between, for example, a relatively long focal length suitable for telephotography and a relatively short focal length suitable for wide-angle photography (which is hereinafter referred to as a tele-wide switch 10 for descriptive purpose), and a shutter release switch 20 with its associated shutter control circuit 30 for controlling the operation of the camera shutter in a well known manner.

Figure 3:
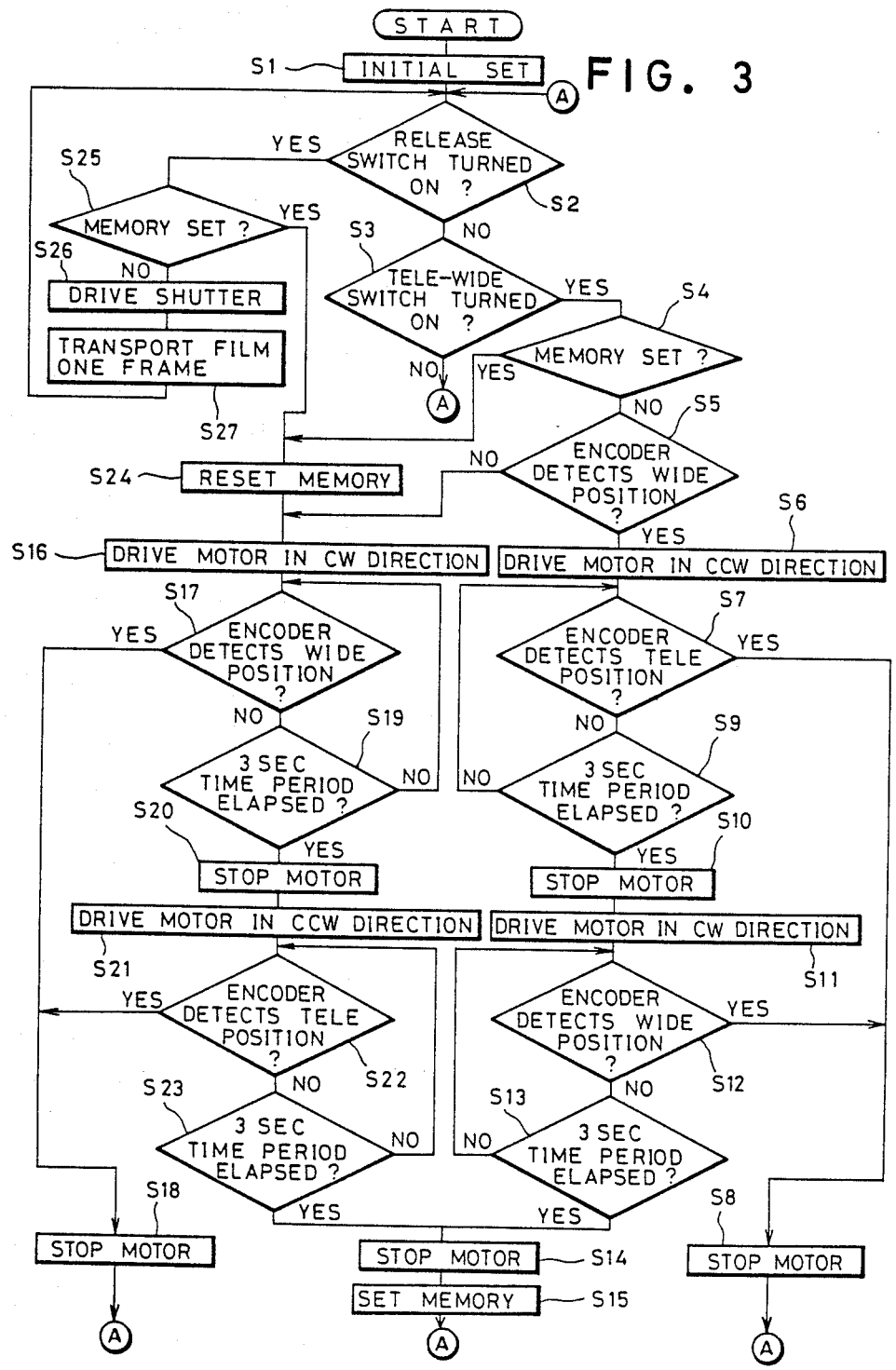
FIG. 3 is a flow chart for explaining the sequential operation of the controller of FIG. 1.

Referring now to FIG. 3, there is shown a flow chart of the general sequence for the operation of the microcomputer of the controller 50. In the sequence shown in FIG. 3, when a main power switch (not shown) is turned on, the changeable focal length camera is set to its initial state at a step S1. The first decision at a step S2 of this sequence routine is to read the condition of the shutter release switch 20 to decide whether the shutter release switch 20 was closed to make an exposure. If the shutter release switch 20 is not yet closed, a second decision is made at a step S3: "has the tele-wide switch 10 been operated." If the answer to the second decision regarding closing of the tele-wide switch 10 is no, the first decision is made again. If the answer to the second decision is yes, another decision is made at a step S4: "has the memory device 52 been set?" If the answer to the other decision is no, this indicates that the lens barrel 82 was normally moved and the lens system 80 was shifted to either one of the telephotographic and wide-angle photographic modes when the last exposure was made.

If in fact the answer to the other decision is no, the position encoder 40 is read to make a fourth decision at a step S4: "is the taking lens system 80 in the wide-angle photographic mode?" If the answer to the fourth decision is yes, this indicates that the tele-wide switch 10 was operated to shift the taking lens system 80 into the telephotographic mode. Then, the motor 70 is caused to rotate in one direction (which is hereinafter referred to as a CCW direction on the drawing) at a step S6 so as to move the lens barrel 82 axially in order to shift the lens system 80 into the telephotographic mode. The axial movment of the lens barrel 82 is monitored by the position encoder 40 to make a fifth decision at a step S7 to detect the completion of shift of the lens system 80 to the telephotographic mode. When the lens barrel 82 is moved to a position wherein the lens system 80 is fully shifted into the telephotographic mode and the position encoder 40 provides a position code signal H-L, the controller 50 stops the motor 70 at a step S8, whereby the camera becomes ready for telephotography. The step S8 orders return to the second step S2. Consequently, the camera becomes ready for exposure and the condition of the shutter release switch 29 is read to decide whether an exposure is required.

On the other hand, if the answer to the fifth decision at the step S7 is no, a sixth decision is made at a step S9: "has a certain time period, for example a three second time period in this embodiment, elapsed?" For counting the three second time period, the controller 50 includes therein a timer circuit well known in the art. These fifth and sixth decisions are repeated each three seconds. If the answer to the sixth decision is yes, this indicates that the lens system 80 has not shifted into the telephotograhic mode in the three second time period. This means that the taking lens moving mechanism 72 or its associated mechanism is temporarily indicated to have a wrong motion and the motor 70 is temporarily stopped on the basis of this indication at a step S10. Thereafter, at a step S11, the motor 70 is restarted to rotate but in the opposite direction (which is hereinafter referred to as a CW direction on the drawing) to shift the lens system 80 into another mode, namely the wide-angle photographic mode in which the lens system 80 previously had been. As soon as the motor 70 is restarted, the same decisions as the fifth and sixth decisions are effected at steps S12 and S13 so as to detect whether the lens system 80 has been shifted into the wide-angle photographic mode in three seconds. If the answer to the decision at the step S12 regarding shifting of the lens system 80 into the wide-angle photographic mode becomes yes in three seconds, the motor 70 is stopped at the step S8. Consequently, the camera is, for convenience sake, shifted into the wide-angle photographic mode although the tele-wide switch 10 has been operated in order to shift the camera into the telephotograhic mode. As a result, the camera is ready for the wide-angle photographic mode.

If the answer to the decision at a step 13 is yes, the motor 70 is also stopped at a step S14 and the memory device 52 is set to register the fact that the lens system 80 cannot be shifted at a step S15. Then, a visual or sound indication is provided prompting the user not to release the shutter button. The final step S15 orders return to the second step S2.

If the answer to the decision at the step S5 is o, this indicates that the lens system 80 has been in the telephotographic mode. In this case, the motor 70 is caused to rotate in the CW direction at a step S16 so as to shift the lens system 80 into the wide-angle photographic mode. The position encoder 40 is repeatedly read for three seconds to detect the lens system 80 shifted into the wide-angle photographic mode at steps S17 and S19. When, as a result of reading of the position encoder 40, the lens system 80 is detected to be in the wide-angle photographic mode, the motor 70 is stopped at the step S18. The camera is thus ready for telephotography.

However, if in fact the taking lens system 80 is not shifted into the wide-angle photographic mode in three seconds, in other words, if the answer to the decision at the step S19 is yes, the motor 70 is temporarily stopped and, thereafter, restarted but in the CCW direction so as to shift the lens system 80 into the telephotographic mode at a step S21. As soon as the motor 70 is restarted, the position encoder 40 is repeatedly read each three seconds at steps S22 and S23. If the lens system 80 is shifted into the telephotographic mode in three seconds, the motor 70 is stopped at the step S18. As a result, the camera is shifted into the telephotographic mode although the tele-wide switch 10 has been operated in order to shift the camera into the wide-angle photographic mode. This allows the camera to take a picture in the telephotographic mode. Otherwise, the memory device 52 is set to register the unusual motion of the lens system 80 after rotation of the motor 70 has stopped. At this time a visual or sound indication is provided.

If the answer to the third decision at the step S4 is yes, this indicates that the camera could not make a normal operation to shift the lens system 80 between the two photographic modes at the last operation of the tele-wide switch 10. Then, the memory device 52 which was set at the last operation of the tele-wide switch 10 is automatically reset at a step S24. Thereafter, the steps S16 through S23 are effected for the purpose of shifting the camera into the wide-angle photographic mode in which the camera is more frequently used.

In any event, after stopping of the motor 70, each step orders a return to the second step S2 to make the first decision regarding closing of the shutter release switch 20.

At the step S2, if the answer to the first decision is yes, another decision is made at a step S25: "has the memory device 52 been set?" If the answer to the decision at the step S25 is yes, this indicates that either the lens barrel 82 or its associated driving mechanism 72 was malfunctioning and, therefore, the lens system 80 was shifted niether to a selected photographic mode nor to a photographic mode in which the taking lens had been. Therefore, the steps S16 through S23 are taken in order to try to shift the camera into the wide-angle photographic mode or the telephotographic mode after the resetting of the memory device 52 at the step 24.

On the other hand, if the answer to the decision at the step 25 is no, indicating that the camera has been properly shifted into a photographic mode selected by the tele-wide switch 10, an exposure and film advance are sequentially automatically effected in any well known manner at steps S26 and S27. The final step S26 orders return to the second step S2 for the next choice of photographic mode or exposure.

As is apparent from the above description, when the tele-wide switch is operated and when the shutter release switch is operated, the camera is controlled to shift the lens system to at least either one of a selected photographic mode or a photographic mode in which it had been. Therefore, in the case wherein a shutter release is allowed, an exposure is effected in either one of two possible photographic modes. This leads to a decreased number of fuzzy pictures and provides timely shots.

Figure 4:
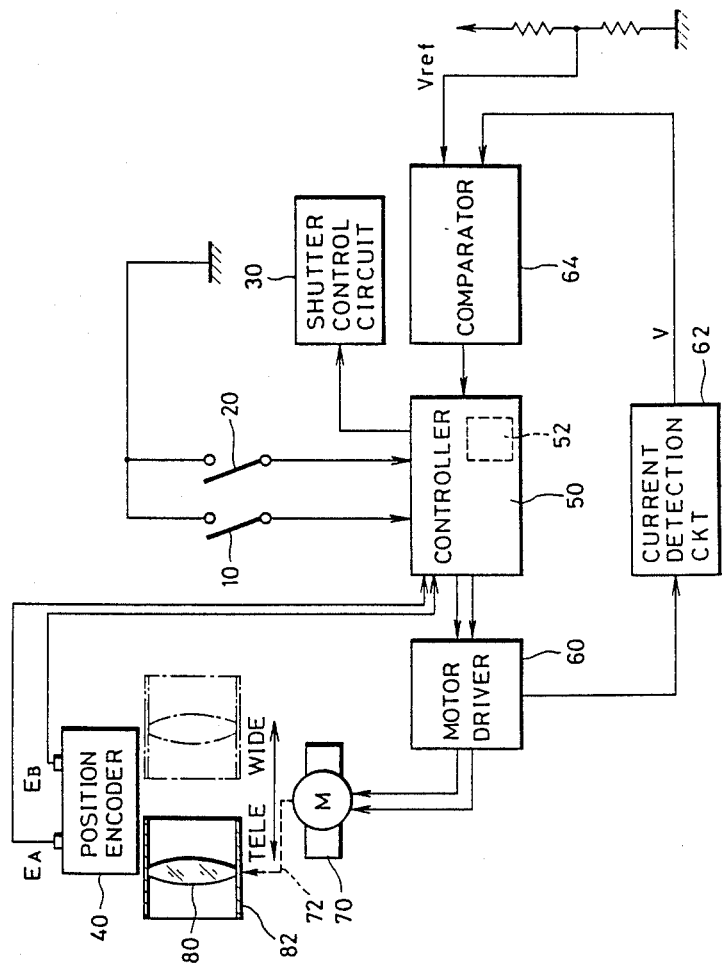
FIG. 4 is a diagrammatic illustration showing the essential parts of a focal length changing mechanism of the camera of another embodiment of the present invention.

It is possible that, in place of detecting the disabled lens barrel due to which the lens system cannot be changed to a selected focal length based on the positions of the lens barrel, a current detecting circuit may be provided to detect an unusual current which flows through the motor 70 when movement of the lens barrel 80 is interrupted or improper. As is shown in FIG. 4, connected to the motor driver 60 is a current detection circuit 62 for detecting a current flowing through the motor 70. As is well known in the art, if the rotation of the motor 70 is interrupted, the current flowing through the motor 60 will change. The change in current flowing through the motor 70 is detected as an unusual current flow by the current detector 60. The detection circuit 62 provides an output voltage V proportional to the detected unusual current and is compared with a predetermined reference voltage $V_{ref}$ by means of a comparator 64. If an output voltage V larger than the reference voltage $V_{ref}$ is detected, the controller 50 controls the motor driver 60 to cut the current to the motor 70. In this manner, improper or discontinuous movement of the lens barrel 82 can be detected by the current detecting circuit 62 with its associated comparator 64.

Although the present invention has been fully described by way of a preferred embodiment thereof with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera having a taking lens system in a lens barrel changeable in focal length between at least two different focal lengths, said camera comprising
    a motor operationally coupled to said lens barrel to move said lens barrel axially back and forth to change said lens system between said at least two different focal lengths;
    switch means for causing said motor to move said lens barrel in one axial direction so as selectively to change said lens system to one of said at least two different focal lengths;
    detecting means for detecting an occurrence of unusual motion of said lens barrel by which said lens system is prevented from being changed to have the focal length selected by said switch means; and
    a controller for controlling said motor to move said lens barrel in another axial direction opposite to said one direction so as to change said lens system to have a focal length different from said focal length selected by said switch means when said detecting means detects the occurrence of unusual motion of said lens barrel.

2. A camera as defined in claim 1, wherein said detecting means includes position detecting means for detecting said lens barrel at different axial positions wherein said lens system has said different focal lengths, respectively, and for signalling the occurrence of unusual motion of said lens barrel when said position detecting means detects the absence of said lens barrel at any axial position for a predetermined period of time.

3. A camera as defined in claim 1, wherein said detecting means includes current detecting means for detecting a current flowing through said motor, and for indicating the occurrence of unusual motion of said lens barrel when said current detecting means detects a current larger than a predetermined value.

4. A camera as defined in claim 1, wherein said controller includes memory means for storing the occurrence of unusual motion of said lens barrel.

5. A camera as defined in claim 4, wherein said memory means is reset when said switch means is operated and when a shutter release is made.

6. A camera as defined in claim 1, wherein said at least two different focal lengths are a relatively short focal length suitable for wide-angle photography and a relatively long focal length suitable for telephotography, respectively.

* * * * *